June 28, 1966  H. G. WRIGHT ETAL  3,258,603
POWER SUPPLY PROTECTION CIRCUIT
Filed Oct. 23, 1962  2 Sheets-Sheet 1

INVENTORS
HARRISON G. WRIGHT
JAMES G. COTTEN
BY  JERROLD FOUTZ

Ernest L. Brown
ATTORNEY

INVENTORS
HARRISON G. WRIGHT
JAMES G. COTTEN
BY JERROLD FOUTZ

*Ernest L. Brown*

ATTORNEY

United States Patent Office 3,258,603
Patented June 28, 1966

3,258,603
POWER SUPPLY PROTECTION CIRCUIT
Harrison G. Wright, Yorba Linda, James G. Cotten, Anaheim, and Jerrold Foutz, La Habra, Calif., assignors to North American Aviation, Inc.
Filed Oct. 23, 1962, Ser. No. 232,396
1 Claim. (Cl. 307—86)

This invention pertains to a means for protecting regulated power supplies against the flow of excessive currents. More particularly, this invention pertains to a means for protecting transistorized, voltage-regulated power supplies against the excessive flow of current through their controlling transistors and for automatically reducing the output voltage to zero until the device of this invention is reset.

In digital computers and data handling systems it is necessary to generate controlled voltages which vary only between narrow limits regardless of the amount of normal load upon the power supply.

Frequently digital computers and data handling systems use a plurality of voltage-regulated power supplies. If the voltage across the output of any one or more of the voltage-regulated power supplies is reduced to zero, it may cause the remaining power supplies to become overloaded.

In the device of this invention, an overload of any one of the power supplies causes the output voltage of at least one of the power supplies to be reduced substantially to zero.

Thus, the voltage regulator power supplies are interconnected so that an excessive current flow in any one of the power supplies interrupts the flow of current in any one or more of the power supplies.

It is, therefore, an object of this invention to interconnect a plurality of power supplies so that an excessive current flow in any one of the power supplies causes the output terminal voltage of all of the interconnected power supplies to be reduced substantially to zero.

It is a more particular object of this invention to use bistable switching means to reduce the voltage across the output terminals of a plurality of voltage-regulated power supplies when an excessive current flows in any one of said supplies.

It is a still more particular object of this invention to use silicon controlled rectifiers to achieve the above enumerated objects.

Other objects will become apparent from the following description taken in connection with the accompanying drawings in which.

Figure 1:
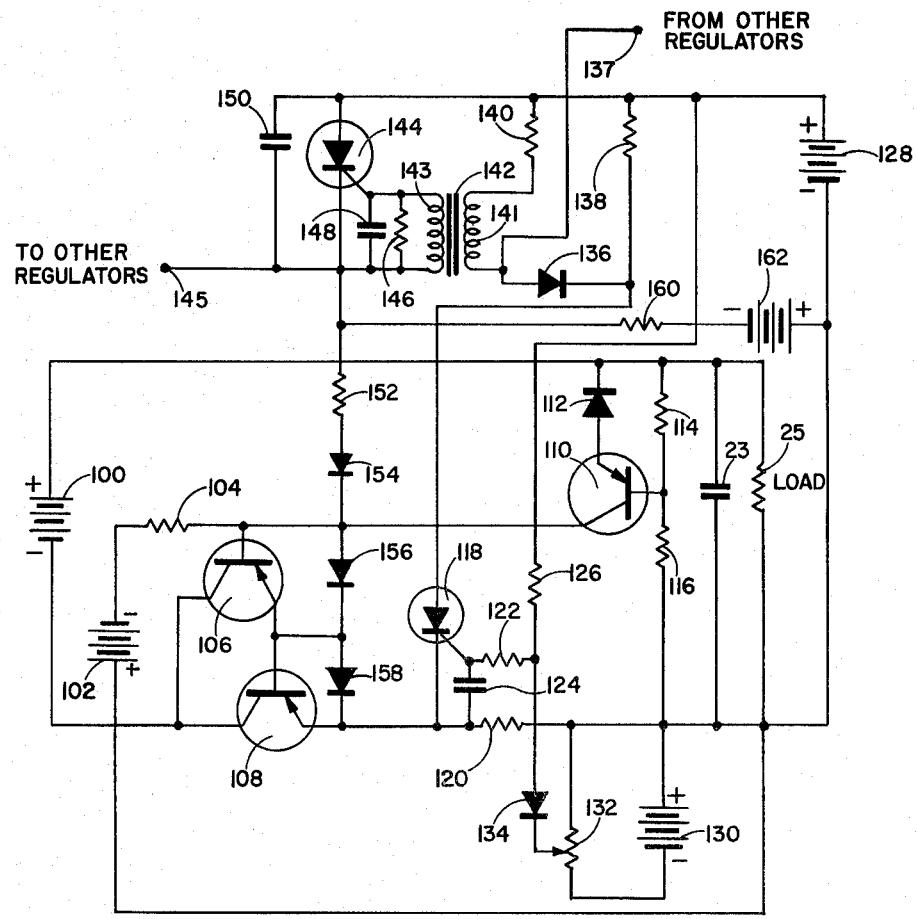
FIG. 1 is a schematic diagram of a first embodiment of this invention.
Figure 2:
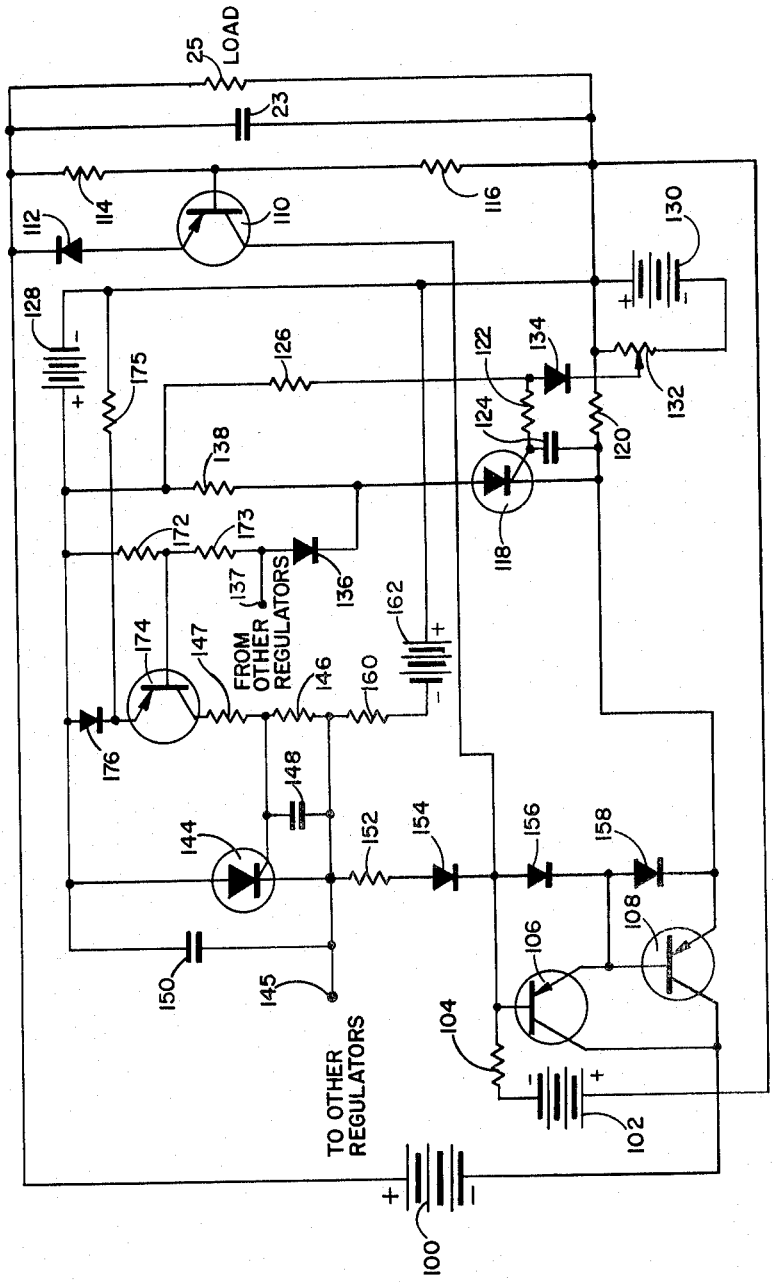
FIG. 2 is a schematic diagram of a second embodiment of this invention.

In the circuit of FIGS. 1 and 2, a source of uncontrolled voltage 100 is connected by its positive terminal to load 25 and by its negative terminal to the collectors of a pair of series regulating PNP transistors 106 and 108. Voltage source 102 is connected by its positive terminal to the negative terminal of load 25 and by its negative terminal, through a voltage dropping resistor 104, to the base of transistor 106, to the anode of diode 156, to the cathode of diode 154, and to the collector of PNP transistor 110. The cathode of diode 156, the anode of diode 158, the emitter of transistor 106, and the base of transistor 108 are connected. The cathode of diode 158 is connected to the emitter of transistor 108, to the cathode of rectifier 118, to condenser 124 and to resistor 120. Controlled rectifier 118—for example, a silicon controlled rectifier of the positive trigger type—is connected by its anode, through a voltage dropping resistor 138, to the positive terminal of voltage source 128. The negative terminal of voltage source 128 is connected to the negative terminal of load 25. The positive terminal of voltage source 128 is also connected through a resistor 126 to the anode of a diode 134. The cathode of diode 134 is connected to the movable member of potentiometer 132 whose fixed terminals are connected between the negative terminal of load 25 and the negative terminal of a bias voltage source 130. The control or gate electrode of the silicon controlled rectifier 118 is biased at a voltage very near that of its cathode by voltage dividing network comprising resistor 126, diode 134 and potentiometer 132. The positive terminal of bias voltage source 130 is connected to the negative terminal of load 25. A current sensing resistor 120 is connected in series with the current flow to load 25 between the emitter of transistor 108 and the negative terminal of load 25. A voltage divider comprising series-connected resistors 114 and 116 is connected across load 25. The junction between resistors 114 and 116 is connected to the base of transistor 110. The cathode of zener diode 112 is connected to the positive terminal of load 25 and the anode of diode 112 is connected to the emitter of transistor 110. The control electrode of controlled rectifier 118 is connected in series with a resistor 122 to the junction between resistor 126 and diode 134. A capacitor 124 is connected between the control electrode and the cathode of controlled rectifier 118.

In the circuit of FIG. 1, a coupling diode 136 is connected with its cathode to the anode of controlled rectifier 118 and its anode in series with winding 141 of transformer 142 and in series with a voltage dropping resistor 140 which is connected to the positive terminal of voltage source 128.

The secondary winding 143 of transformer 142 is connected across resistor 146 in parallel with capacitor 148 between the control electrode and the cathode of controlled rectifier 144. Controlled rectifier 144 may—for example—be a silicon controlled rectifier of the positive trigger type. Capacitor 150 is connected between the anode and cathode of controlled rectifier 144. The anode of controlled rectifier 144 is connected to the positive terminal of voltage source 128. A switch (not shown) may be connected in the anode path of each of the controlled rectifiers to reset them.

In FIG. 2, the anode of controlled rectifier 118 is connected through a coupling diode 136 in series with resistors 172 and 173 to the positive terminal of voltage source 128. The junction between resistors 172 and 173 is connected to the base of PNP transistor 174. Diode 176 is connected in series with resistor 175 across voltage source 128 with the anode of diode 176 connected to the positive terminal of voltage source 128. The junction between diode 176 and resistor 175 is connected to the emitter of transistor 174. The collector of transistor 174 is connected through a resistor 147 to the control electrode of controlled rectifier 144 which may be a silicon controlled rectifier of the NPNP type. Resistor 146 is connected in parallel with capacitor 148 between the control electrode and the cathode of controlled rectifier 144. Capacitor 150 is connected between the anode and cathode of controlled rectifier 144.

In FIGS. 1 and 2, voltage source 162 is connected by its positive terminal to the negative terminal of load 25 and by its negative terminal through resistor 160 to the cathode of controlled rectifier 144. The cathode of controlled rectifier 144 is connected through the series connection of resistor 152 and diode 154 to the base of transistor 106.

Terminal 137 is connected in FIG. 1 to the junction between the anode of diode 136 and winding 141 of transformer 142. Terminal 137 is connected in FIG. 2 to the junction between the anode of diode 136 and resistor 173. Other regulators may be connected to be controlled by the conduction or non-conduction of controlled rectifier 144 by connecting them in parallel to the terminal 145, connected to the cathode of controlled rectifier 144 and terminal 137.

In the absence of an overload, current flows from voltage source 100 through load 25, through current sensing resistor 120, and through the emitter to collector circuit of the series regulating transistor 108.

The emitter of transistor 110 is maintained at a substantially constant potential relative to the positive terminal of load 25 by means of zener diode 112. If the voltage across load 25 tends to increase, the base of transistor 110 becomes more negative with respect to the emitter of transistor 110 which increases its emitter to collector current. An increased emitter to collector current flow through transistor 110 increases the current flow through resistor 104. An increased current flow through resistor 104 causes the base of transistor 106 to become less negative with respect to its emitter. When the base of transistor 106 becomes less negative with respect to its emitter, the emitter to collector current of transistor 106 is decreased. This causes the base of power transistor 108 to become less negative with respect to its emitter. When the base of transistor 108 becomes less negative with respect to its emitter, the emitter to collector current flow of transistor 108 is reduced, which also reduces the current flow through load 25 and causes the voltage across load 25 to be returned to its regulated value.

If an overload of current occurs through load 25, the voltage across current sensing resistor 120 increases. When the voltage across resistor 120 increases, the voltage difference between the control electrode of the silicon controlled rectifier and its cathode increases. The position of the movable member of potentiometer 132, the voltage-current-temperature characteristic of diode 134, and the temperature characteristic of resistor 122 are selected and adjusted to compensate for changing temperatures and for setting the value of overload current which causes controlled rectifier 118 to conduct. An overload of short duration is prevented by condenser 124 from causing controlled rectifier 118 to conduct. Temporary overloads cause condenser 124 to charge at a rate which is controlled by the time constant of its charging circuit comprising resistors 122 and 126.

When the voltage between the control electrode and the cathode of controlled rectifier 118 reaches a predetermined critical value, the controlled rectifier 118 conducts in its anode to cathode current path.

When the controlled rectifier 118 conducts in its anode to cathode current path, the voltage between the anode and cathode of controlled rectifier 118 is reduced which causes the anode of rectifier 118 to become more negative with respect to the positive terminal of voltage source 128.

When the anode of controlled rectifier 118 becomes more negative with respect to the positive electrode of voltage source 128, diode 136 conducts.

In the circuit of FIG. 1, the conduction of diode 136 is through winding 141 of transformer 142 and through resistor 140 to cause a voltage to appear across secondary winding 143 of transformer 142 and across resistor 146 and condenser 148 connected between the control electrode and cathode of controlled rectifier 144.

In the circuit of FIG. 2, the conduction of diode 136 is through resistors 172 and 173 which are shown connected at their junction to the base of transistor 174. The relative values of resistors 172 and 173 depends upon the particular characteristics of transistor 174. The conduction of diode 136 causes the base of transistor 174 to become more negative with respect to the emitter of transistor 174, which increases the current flow from the emitter to collector of transistor 174 through resistors 147, 146 and 160. The increase of current through resistor 146 causes a voltage to appear across resistor 146 and condenser 148 and between the control electrode and cathode of controlled rectifier 144.

In the device of this invention as shown in either FIG. 1 or 2, the conduction between the anode and cathode of controlled rectifier 144 causes terminal 145 to become more positive. As terminal 145 becomes more positive, current flows from voltage source 128 through the anode-to-cathode current path of controlled rectifier 144 thence through resistor 152 and diodes 154, 156 and 158 to cause the bases of transistors 106 and 108 to become more positive with respect to their emitters which thereby opens the current circuit to load 25.

If a signal is received, from another regulator or regulated power supply at terminal 137, which is of sufficient intensity and proper polarity to cause a current flow through the winding 141 of transformer 142 or through resistors 172 and 173 of FIG. 2, the power supply or regulator of the circuit shown in the figures is opened as previously described for an overload through load 25. If other regulators or regulative power supplies are connected similarly to terminal 145 they will be controlled to open the circuit to their respective loads in response to the anode to cathode conduction of controlled rectifier 144 common to all other regulators.

Although transistors of a particular polarity type, namely PNP type, are shown and described above and although a silicon controlled rectifier of the positive trigger type is described and shown in the circuits above, it is obvious that the circuit of this invention may be utilized by replacing all PNP transistors by NPN transistors, by replacing the positive trigger controlled rectifiers with negative trigger controlled rectifiers, by reversing the polarity of each and every diode, and by reversing the polarity of each and every voltage source.

Thus, the device of this invention may be utilized in complex circuitry where a plurality of controlled or regulated power supplies are utilized to prevent overload upon one or more of the power supplies by the opening of one particular power supply.

Although the invention has been described in detail above, it is to be understood that the invention is to be interpreted in accordance with the scope of the appended claim in which we claim:

In combination,
first supply means for delivering regulated power to a load,
first means connected between said first supply means and said load for sensing current from said regulated power supply means to said load,
threshold means coupled to said first means for generating an overload condition signal at an output terminal thereof when a predetermined amplitude of current is sensed by said first means,
bistable switching means for generating a cut-off signal at an output terminal thereof upon being switched from a first to a second stable state, said switching means having an input terminal for switching control,
second means for coupling the output terminal of said threshold means to said input terminal of said bistable switching means, whereby said bistable switching means is switched to its second stable state in response to an overload condition signal,
third means coupling the output terminal of said bistable switching means to said regulated power supply means for cutting off power from said supply to said load in response to a cut-off signal from said bistable switching means; and
the combination recited above wherein is added at least one additional supply means for delivering regulated power to a respective load, each said additional regulated power supply means having associated therewith an individual first means and a threshold means in a relation thereto corresponding with the relation of said first means and threshold means for said first power supply means and wherein said second means comprises a plurality of isolating diodes having input and output terminals, the input terminal of each diode being connected to the output terminal of a different threshold means associated with a different one of said supply means and the output terminal of each diode being connected to the input terminal of said bistable switching means, and wherein said third means couples the output terminal of said bistable switching means to each of said regulated power supply means for cutting off power delivered by all regulated power supply means.

References Cited by the Examiner

UNITED STATES PATENTS

| | | | |
|---|---|---|---|
| 2,979,653 | 4/1961 | Wilcox et al. | 323—22 |
| 2,980,845 | 4/1961 | Thompson et al. | 323—22 |
| 3,048,718 | 8/1962 | Starzec | 307—93 |
| 3,076,135 | 1/1963 | Farnsworth et al. | 307—88.5 |
| 3,078,410 | 2/1963 | Thomas | 317—33 |
| 3,173,078 | 3/1965 | Farnsworth | 323—22 |

ORIS L. RADER, *Primary Examiner.*

LLOYD McCOLLUM, *Examiner.*

L. R. CASSETT, T. J. MADDEN, *Assistant Examiners.*